(12) United States Patent
Burke, Jr.

(10) Patent No.: US 8,630,008 B2
(45) Date of Patent: Jan. 14, 2014

(54) METHOD AND SYSTEM FOR MANAGING PRINT DEVICE INFORMATION USING A CLOUD ADMINISTRATION SYSTEM

(75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 321 days.

(21) Appl. No.: 13/112,552

(22) Filed: May 20, 2011

(65) Prior Publication Data

US 2012/0293830 A1 Nov. 22, 2012

(51) Int. Cl.
*G06F 3/12* (2006.01)
*G06K 15/00* (2006.01)

(52) U.S. Cl.
CPC .............. *G06K 15/00* (2013.01); *G06F 3/1296* (2013.01)
USPC .......................................... 358/1.15; 358/1.16

(58) Field of Classification Search
USPC ............... 358/400, 1.15, 1.14, 444, 468, 404, 358/1.16
See application file for complete search history.

(56) References Cited

U.S. PATENT DOCUMENTS

| | | | |
|---|---|---|---|
| 5,128,878 A | 7/1992 | Gore et al. | |
| 5,305,199 A | 4/1994 | LoBiondo et al. | |
| 6,304,732 B1 | 10/2001 | Myers et al. | |
| 6,647,222 B1 | 11/2003 | Digby et al. | |
| 7,317,882 B2 | 1/2008 | Dombrowski | |
| 7,574,496 B2 | 8/2009 | McCrory et al. | |
| 7,587,146 B2 | 9/2009 | Horn | |
| 7,649,638 B2 | 1/2010 | Beard et al. | |
| 7,650,085 B2 | 1/2010 | Kehoe et al. | |
| 7,667,874 B2 | 2/2010 | MacDonald et al. | |
| 7,773,239 B2 | 8/2010 | Beard et al. | |
| 1,004,720 A1 | 2/2011 | Mansoor et al. | |
| 8,009,302 B2 | 8/2011 | Martin | |
| 8,139,238 B2 | 3/2012 | Oki | |
| 8,310,703 B2 * | 11/2012 | Nuggehalli et al. | 358/1.15 |
| 2003/0053118 A1 | 3/2003 | Muramoto et al. | |
| 2006/0139687 A1 | 6/2006 | Ohara et al. | |
| 2008/0055621 A1 | 3/2008 | Price et al. | |
| 2008/0130051 A1 | 6/2008 | Lawrence et al. | |
| 2010/0103445 A1 | 4/2010 | Levine et al. | |
| 2010/0296122 A1 | 11/2010 | Mitsui | |
| 2010/0302573 A1 | 12/2010 | Hakozaki | |
| 2010/0332629 A1 | 12/2010 | Cotugno et al. | |
| 2011/0228351 A1 | 9/2011 | Uchida et al. | |
| 2011/0235085 A1 * | 9/2011 | Jazayeri et al. | 358/1.14 |
| 2011/0255128 A1 * | 10/2011 | Ozawa | 358/1.15 |
| 2011/0292431 A1 | 12/2011 | Cok | |

(Continued)

OTHER PUBLICATIONS

B. Pellow, "Moving to the Cloud", Business Development Services Analysis, Nov. 2010, InfoTrends 2010, pp. 1-7.

(Continued)

*Primary Examiner* — Jerome Grant, II
(74) *Attorney, Agent, or Firm* — Fox Rothschild LLP

(57) ABSTRACT

A print device may include an inbound queue in communication with a cloud administration system via a firewall. The cloud administration system may operate as a shared resource for the print device. The print device may include a transmission module in communication with the cloud administration system, and a plurality of outbound queues. Each outbound queue may correspond to a print job type or a type of print device information. Each queue may be in communication with the transmission module. The cloud administration system may be located remotely from the print device.

20 Claims, 5 Drawing Sheets

(56) References Cited

U.S. PATENT DOCUMENTS

2011/0292435 A1   12/2011  Cok et al.
2012/0113458 A1*  5/2012  Benedek ..................... 358/1.15
2012/0293826 A1   11/2012  Saurabh

OTHER PUBLICATIONS

A. Wawro, "Cloud Printers Rain on Security Parade", PC World, Apr. 2011, vol. 29, No. 4, p. 36.

* cited by examiner

METHOD AND SYSTEM FOR MANAGING PRINT DEVICE INFORMATION USING A CLOUD ADMINISTRATION SYSTEM

CROSS-REFERENCE TO RELATED APPLICATIONS

This application is related to United States Patent Application Publication Numbers 2012/0293827 entitled "Method And System For Managing Print Jobs Using A Cloud Administration System", 2012/0293828 entitled "Method And System For Managing Print Device Information Using A Cloud Administration System", 2012/0297375 entitled "Methods And Systems For Providing Software Updates Using A Cloud Administration System", 2012/0293829 entitled "Methods And Systems For Tracking and Managing Print Device Inventory Information Using a Cloud Administration System", and 2012/0293831 entitled "Methods And Systems For Managing Print Device Licenses Using A Cloud Administration System" each filed on May 20, 2011.

Not Applicable

BACKGROUND

Typically, print-related services and solutions require providing onsite resources to a customer, such as software, hardware and personnel. In addition, numerous print-related services and solutions may operate autonomously, even though they utilize similar delivery mechanisms and backend connectivity. As such, providing print-related services can often be costly and inefficient.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a print device may include an inbound queue in communication with a cloud administration system via a firewall. The cloud administration system may operate as a shared resource for the print device. The print device may include a transmission module in communication with the cloud administration system, and a plurality of outbound queues. Each outbound queue may correspond to a print job type or a type of print device information. Each queue may be in communication with the transmission module. The cloud administration system may be located remotely from the print device.

In an embodiment, a method of managing a print job may include receiving, by a print device, a print job, storing the print job in a queue associated with the print device; and transmitting the print job to a cloud administration system to be stored in a storage module associated with the cloud administration system that corresponds to the queue. The cloud administration system may be located remotely from the print device. A firewall may exist between the cloud administration system and the print device.

In an embodiment, a method of managing print device information may include receiving, by a transmission module of a print device, print device information associated with the print device over a period of time from a queue associated with the print device, and transmitting, by the transmission module, the print device information to a cloud administration system in communication with the print device. The print device may be located remotely from the cloud administration system. A firewall may exist between the cloud administration system and the print device.

DETAILED DESCRIPTION

Figure 1A:
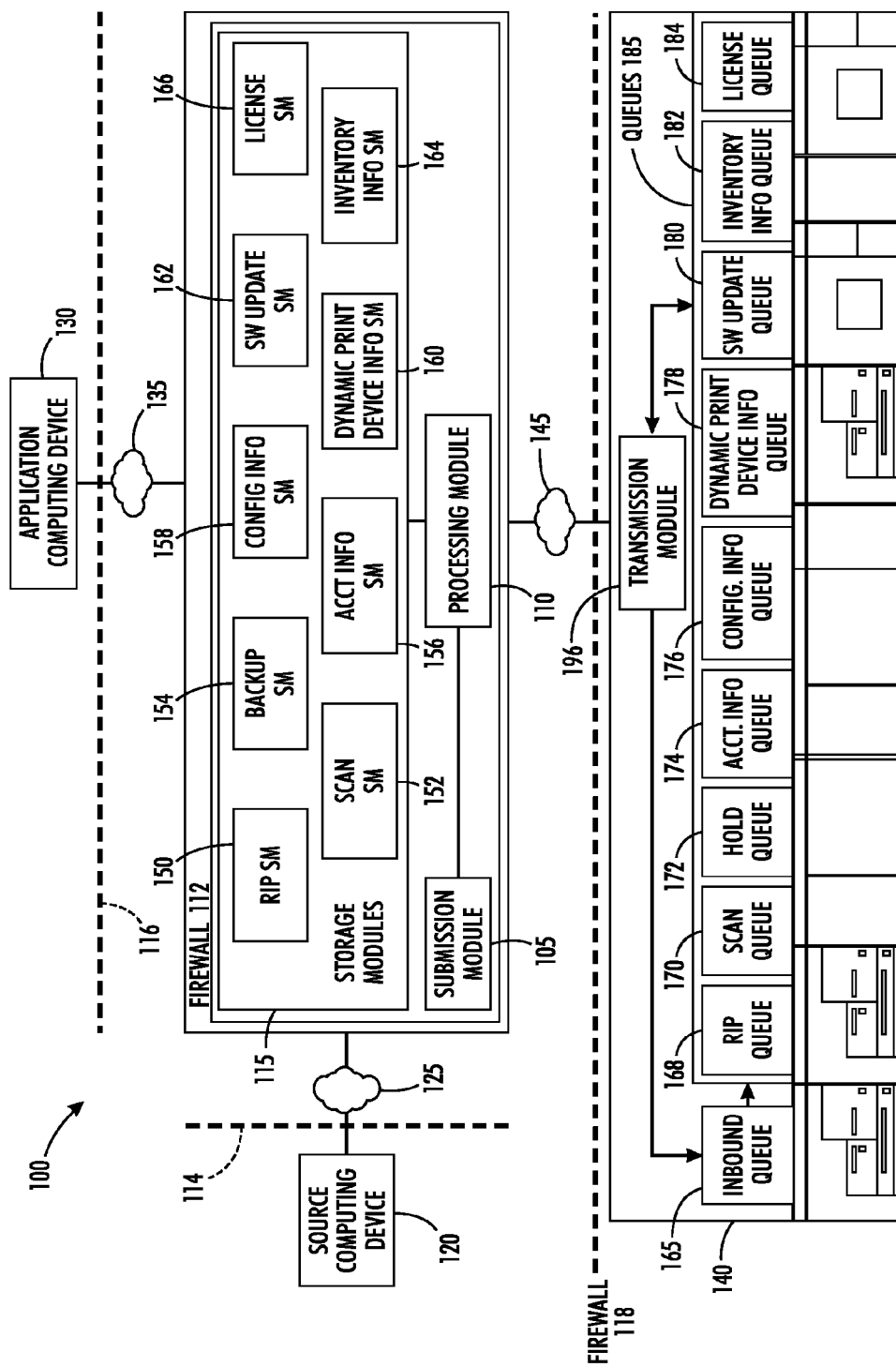
FIGS. 1A and 1B illustrate exemplary cloud administration systems according to an embodiment.

The following terms shall have, for the purposes of this application, the respective meanings set forth below.

"Accounting information" is information relating to the cost of processing one or more print jobs by an associated print job. Exemplary accounting information may include a number of impressions, a number of monochrome impressions, a number of color impressions, a price per impression and/or the like.

An "application computing device" is a computing device capable of sending information to and/or receiving information from a cloud administration system.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. An exemplary computing device or processor is described in reference to FIG. 5.

"Configuration information" is information relating to the configuration of a print device. Exemplary configuration information may include information associated with one or more print trays of a print device, a memory of the print device, error logs of the print device, settings of the print device, properties of the print device and/or the like.

"Dynamic print device information" is information relating to the configuration and/or operation of a print device that is not configuration information. Exemplary dynamic print device information may include registry values, service statuses, process statuses and/or the like.

A "firewall" is hardware and/or software used to protect a resource of a network from unauthorized external access.

A "job" refers to a logical unit of work that is to be completed for a customer.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or a "print-related function" is a function that is performed on a print job. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

"Print device information" means accounting information, configuration information and/or dynamic print device information associated with a print device.

A "queue" is a data structure stored on a computer-readable medium and configured to temporarily store information, including, but not limited to, a print job, print device information and/or the like.

The term "remote," as used herein with respect to computing devices and/or print devices, refers to devices that operate on different computer networks and/or computer networks operated by different entities. For example, a computing device is remote from a print device if the computing device is connected to a first LAN operated by a first entity and the print device is connected to a second LAN operated by a second entity.

A "resource" is a physical device having a processor and/or a storage medium. Exemplary resources may include a computing device, a processing device a storage device and/or the like.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

FIG. 1A illustrates an exemplary cloud administration system according to an embodiment. As illustrated by FIG. 1A, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1A, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166 and/or the like. Storage modules 115 are discussed in more detail below.

In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1A, a print device may have a RIP queue 168, a scan queue 170, a hold queue 172, an accounting information queue 174, a configuration information queue 176, a dynamic print device information queue 178, a software update queue 180, an inventory information queue 182, a license queue 184 and/or the like. Queues 185 are discussed in more detail below.

In an embodiment, a print device 140 may have a transmission module 196. A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may not communicate directly with one another. As illustrated by FIG. 1A, the source computing device 120, the application computing device 130 and the print device 140 may communicate indirectly via a cloud administration system 100.

Figure 1B:
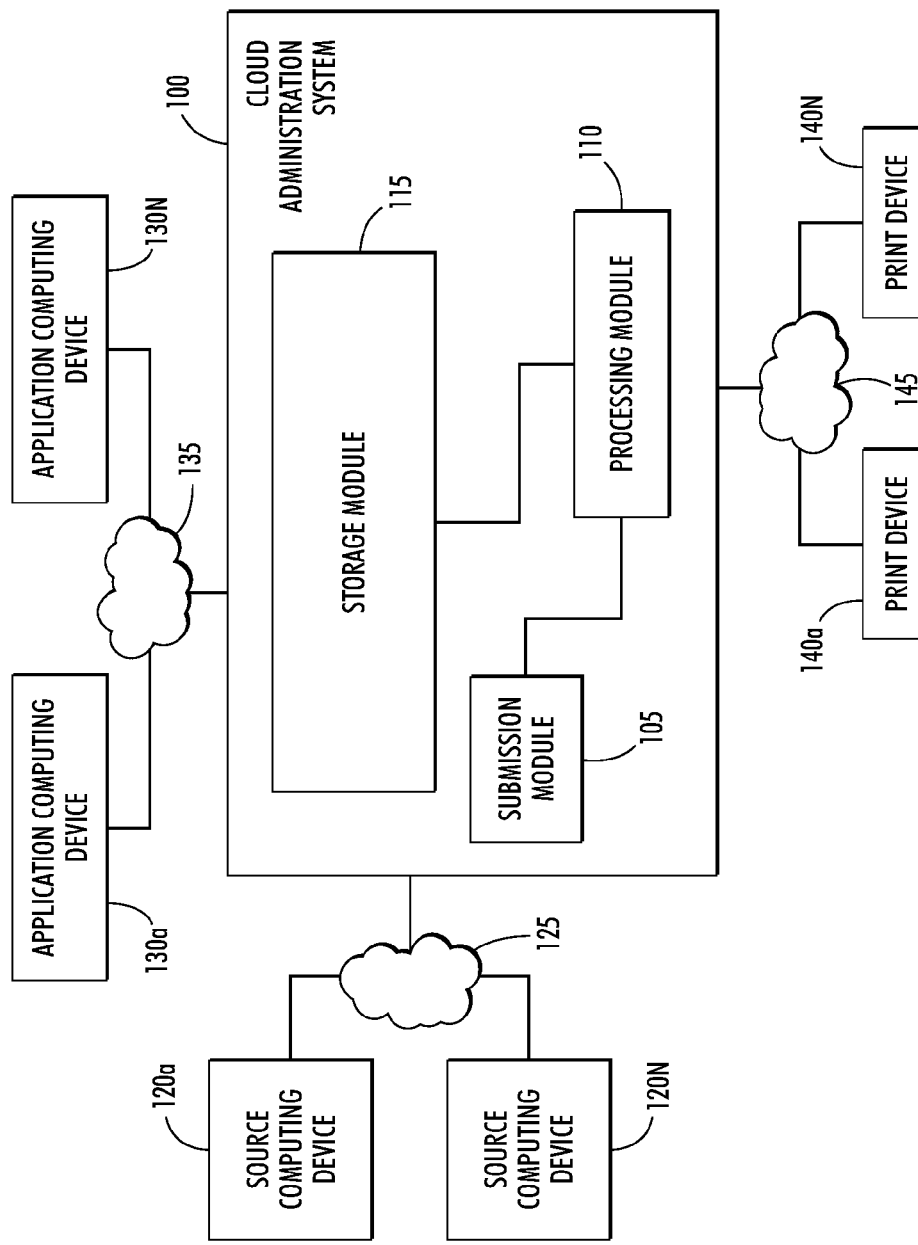

FIG. 1B depicts an exemplary cloud administration system according to an embodiment. As illustrated by FIG. 1B, a cloud administration system 100 may communicate with more than one source computing device 120*a*-N, application computing device 130*a*-N and/or print device 140*a*-N.

Figure 2:
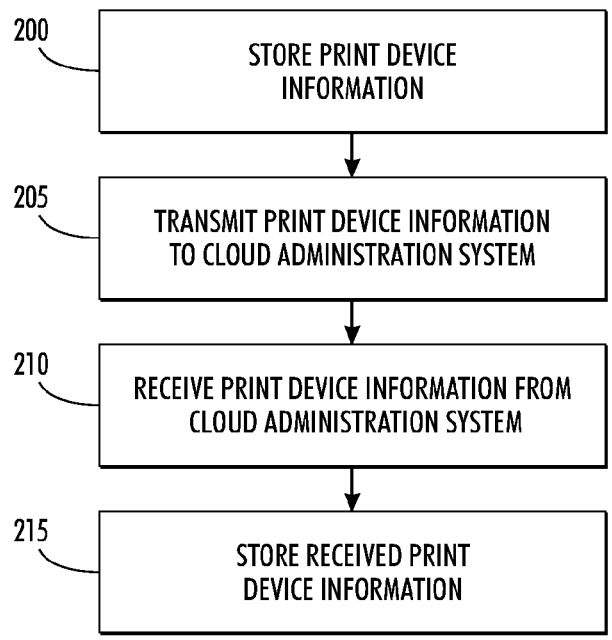
FIG. 2 illustrates an exemplary method of managing accounting information according to an embodiment.

FIG. 2 illustrates an exemplary method of managing print device information according to an embodiment. As illustrated by FIG. 2, print device information may be stored 200 in a queue associated with a print device. In an embodiment, accounting information, configuration information and/or dynamic print device information may be different types of print device information. In an embodiment, a queue may be dedicated to storing a particular type of print device information associated with the print device. For example, accounting information may be stored in an accounting information queue, such as the accounting information queue 174 illustrated in FIG. 1A. As another example, configuration information may be stored in a configuration information queue, such as the configuration information queue 176 illustrated in FIG. 1A. Similarly, dynamic print device information may be stored in a dynamic print device information queue, such as the dynamic print device information queue 199 illustrated in FIG. 1A.

In an embodiment, the print device information may be associated with a client of a print device vendor or service provider. For example, a corporate client of a print service provider may operate a print device at the client's place of business. Print device information, such as accounting information, may be associated with the client's use and operation of the print device.

In an embodiment, accounting information may include a number of total impressions processed by a print device over a period of time, a number of monochrome impressions processed by a print device over a period of time, a number of color impressions processed by a print device over a period of time, a color price per impression, a monochrome price per impression, a number of print-related functions performed by a print device over a period of time, and a cost associated with one or more print-related functions.

In an embodiment, print-related functions may include stapling, collating, sorting, punching, binding and/or the like. In an embodiment, each print-related function may be associated with a price. In an embodiment, a price associated with a print-related function may be based on a number of pages on which the print-related function is performed. For example, stapling two to thirty pages may cost one price, while stapling documents having more than thirty pages may cost a different price.

In an embodiment, price information may be pre-programmed in a print device. In an embodiment, price information may be received by a print device from a computing device in communication with the print device. For example, a print device may be pre-programmed with then-current price information. If the price information is updated at a later time, the updated price information may be sent to and stored on the print device.

In an embodiment, configuration information may include information associated with one or more print trays, a memory, one or more error logs, one or more settings and/or one or more properties of a print device, a printer name associated with a print device, a printer uniform resource identifier associated with a print device, a location associated with a print device, a model associated with a print device and/or the like.

In an embodiment, dynamic print device information may include information associated with a print device that is not configuration information. Exemplary dynamic print device information may include a registry value, file version information, an indication of whether an expression exists inside a file, an indication of whether a string exists inside of a file, an indication of whether a file exists, an indication of whether a file path exists, a service status, a process status and/or the like.

In an embodiment, print device information may be transmitted 205 from a print device to a cloud administration system. In an embodiment, print device information may be transmitted 205 to a cloud administration system periodically or intermittently. For example, print device information may be transmitted 205 to a cloud administration system at regular intervals, such as daily. In an alternate embodiment, print device information may be transmitted 205 to a cloud administration system in response to a print device receiving a request for accounting information from a cloud administration system or other computing device in communication with the print device.

In an embodiment, print device information may be transmitted 205 from a queue of a print device. For example, accounting information may be transmitted 205 from an accounting information queue of a print device. In an embodiment, configuration information may be transmitted 205 from a configuration information queue of a print device. In an embodiment, dynamic print device information may be transmitted 205 from a dynamic print device information queue of a print device.

Alternatively, print device information may be transmitted 205 from a transmission module of a print device. For example, accounting information may be sent from an accounting information queue of a print device to a transmission module of a print device. The accounting information may be transmitted 205 from the transmission module. In an embodiment, print device information may be retrieved from a queue by a transmission module, and then transmitted 205 by the transmission module.

In an embodiment, print device information may be transmitted 205 to a cloud administration system. In an embodiment, print device information may be transmitted 205 to a processing module of a cloud administration system. The processing module may store the received print device information in a storage module associated with the cloud administration system. For example, the cloud administration system may have one or more storage modules that are dedicated to storing print device information. For example, a cloud administration system may have an accounting information storage module such as the accounting information storage module 188 illustrated in FIG. 1A. Accounting information that is received from a print device may be stored in one or more of these dedicated storage modules.

In an embodiment, a cloud administration system may have a configuration information storage module, such as the configuration storage module 190 illustrated in FIG. 1A. Configuration information that is received from a print device may be stored in one or more of these dedicated storage modules. In an embodiment, the storage module of the cloud administration system in which the configuration information is stored may be associated with the print device queue of the print device from which the configuration information was received.

In an embodiment, a cloud administration system may have a dynamic print device information storage module, such as the dynamic print device information storage module 198 illustrated in FIG. 1A. Dynamic print device information that is received from a print device may be stored in one or more of these dedicated storage modules. In an embodiment, the storage module of the cloud administration system in which the dynamic print device information is stored may be associated with the print device queue of the print device from which the dynamic print device information was received.

In an embodiment, received print device information may be stored along with an indicator of its source. For example, an identifier associated with the print device from which the account information was received, such as a print device name, serial number and/or the like may be stored with the information. In an embodiment, a customer or entity associated with the print device from which the account information was received may be stored with the accounting information.

In an embodiment, print device information may be received 210 by a print device from a cloud administration system. For example, configuration information may be received 210 by a print device if the configuration information stored on the print device is corrupted or otherwise becomes inaccessible or unavailable. In an embodiment, configuration information may be received by a cloud administration system from an application computing device and then transmitted from the cloud administration system to the print device. In an alternate embodiment, configuration information may be retrieved from a storage module associated with the cloud administration system and transmitted to the print device to which the configuration information corresponds. In an embodiment, the received configuration information may be stored 215 by the print device. For example, the received configuration information may be used to replace or restore configuration information that had become inaccessible.

Figure 3:
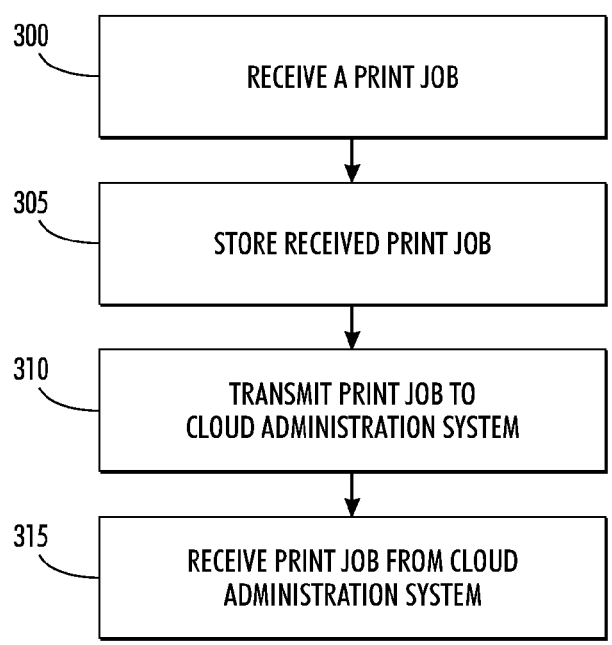
FIG. 3 illustrates an exemplary method of managing configuration information according to an embodiment.

FIG. 3 illustrates an exemplary method of managing a print job according to an embodiment. As illustrated by FIG. 3, a print device may receive 300 a print job. In an embodiment, a print device may receive 300 a print job from a computing device in communication with the print device. For example, a computing device in communication with a print device may send a print job to the print device to be printed or otherwise processed.

In an embodiment, a print device may receive 300 a print job via an interface of the print device. For example, a print device may receive a print job that is scanned using the print device.

In an embodiment, a received print job may be stored 305 in one or more queues associated with the print device. In an embodiment, a print job may be stored 305 in a certain queue based on a content of the print job, a type of processing to perform on the print job and/or the like. For example, a print job that is to be raster image processed may be stored 305 in a raster image processing (RIP) queue associated with a print device. As another example, a print job that is scanned to a print device may be stored 305 in a scan queue associated with a print device. In an embodiment, a print job that is to be printed at a later time may be stored 305 in a hold queue associated with a print device.

In an embodiment, a print job may be transmitted 310 from a print device to a cloud administration system. A print job may be transmitted from a queue of the print device. For example, a print job to be raster image processed may be transmitted 310 from a RIP queue of a print device to a cloud administration system.

In an embodiment, a print job may be transmitted 310 from a transmission module of a print device. For example, a print job may be sent from a queue of a print device to a transmission module of a print device, and the print job may be transmitted 310 from the transmission module. In an embodiment, a print job may be retrieved from a queue by a transmission module, and then transmitted 310 by the transmission module.

In an embodiment, a print job may be transmitted 310 to a cloud administration system. In an embodiment, print device information may be transmitted 310 to a processing module of a cloud administration system. The processing module may store the received print job in a storage module associated with the cloud administration system. For example, the cloud administration system may have one or more storage modules that are dedicated to storing print jobs. For example, a cloud administration system may have a RIP storage module, such as the RIP storage module 150 illustrated in FIG. 1A that may store received print jobs that are to be raster image processed. In an embodiment, a cloud administration system may have a scan storage module, such as the scan storage module 152 illustrated in FIG. 1A, that may store received print jobs that are scanned. In an embodiment, a cloud administration system may have a backup storage module, such as the backup storage module 154 illustrated in FIG. 1A, that may store print jobs that are to be printed at a later time.

In an embodiment, a print job may be received 315 by a print device from a cloud administration system. In an embodiment, a print job may be received 315 by the print device that sent the print job to the cloud administration system. For example, a print device may transmit 310 a print job to be raster image processed to a cloud administration system. Once the print job has been raster image processed, the cloud administration system may transmit the print job to the print device or to another print device to be printed. As another example, a print job may be transmitted 310 to the cloud administration system and stored in a hold storage module. The print job may be transmitted to the print device, or to another print device, to be printed or stored by the print device.

Figure 4:
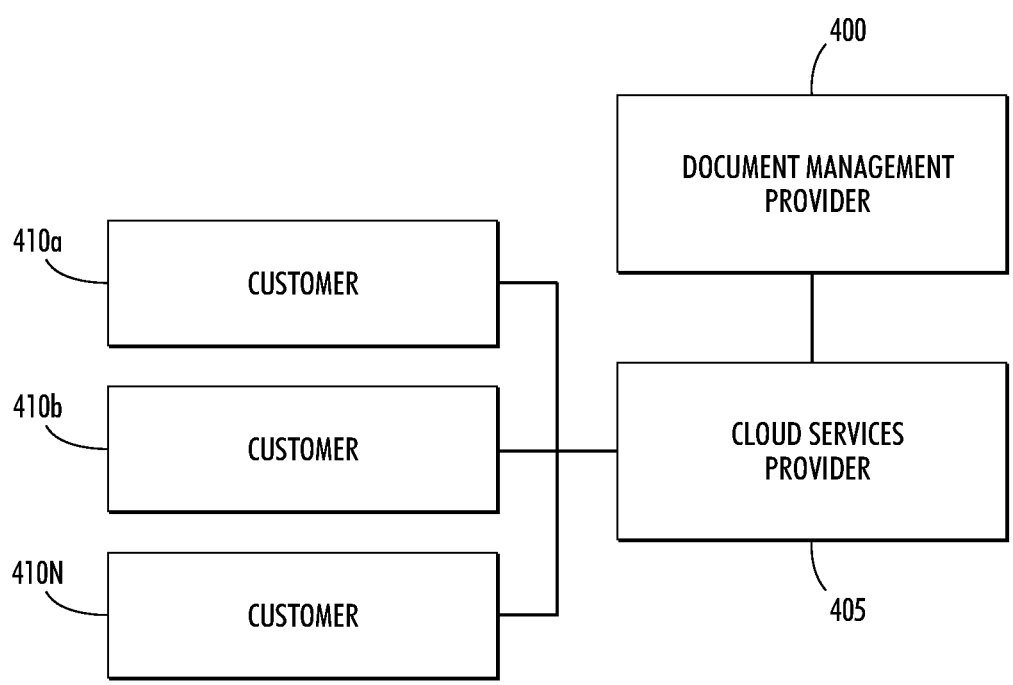
FIG. 4 illustrates an exemplary implementation of a cloud administration system according to an embodiment.

FIG. 4 illustrates an exemplary implementation of a cloud administration system according to an embodiment. A document management provider 400 may contract with a cloud services provider 405 to provide cloud services to the document management provider's customers 410a-N. A document management provider 400 may be an entity that supplies, manages and/or maintains print devices, processes print jobs and/or performs other document management services. A cloud services provider 405 may operate and/or maintain a cloud administration system to provide cloud services. Cloud services may include applications that are accessed remotely on demand from a cloud services provider that hosts the applications. Cloud services may include applications for document management, document processing, account management, print device configuration, document retention and backup, and/or the like.

In an embodiment, a computing device operated by a customer 410a-N may communicate directly with a cloud administration system. For example, a print device utilized by a customer 410a-N at the customer's location may send print device information to a cloud administration system operated by a cloud services provider 405. The cloud administration system may store the print device information. In an embodiment, an application computing device operated by the document management provider 400 or another entity with whom the document management provider has contracted, may access print device information from the cloud administration system.

For example, a cloud administration system may store accounting information associated with print devices operated by a customer 410a-N. The document management provider 400 may access the accounting information via an application computing device from the cloud administration system in order to generate a bill for the customer 410a-N. For example, the document provider 400 may export the accounting information to a billing application. In an alternate embodiment, a billing service or other account management service with whom the document management provider 400 contracts for customer billing, may access the accounting information via an application computing device from the cloud administration system in order to generate a bill for the customer 410a-N.

As another example, a cloud administration system may store configuration information associated with a print device operated by a customer 410a-N. The document management provider 400 may access configuration information via an application computing device from the cloud administration system. The configuration information may be sent back to the print device if the configuration information that is stored on the print device becomes corrupted or otherwise inaccessible.

As another example, a cloud administration system may store dynamic print device information associated with a print device operated by a customer 410a-N. The document management provider 400 may access dynamic print device information via an application computing device from the cloud administration system in order to monitor a print job's progress, a print device's performance and/or the like.

As another example, a cloud administration system may store a print job from a customer 410a-N that is to be raster image processed. The document management provider 400 may access the print job via an application computing device from the cloud administrative system in order to raster image process the print job. In an alternate embodiment, a service or other entity with which the document management provider 400 contracts for raster image processing services may access the print job via an application computing device from the cloud administrative system in order to raster image process the print job. The cloud administration system may then send the raster image processed print job to a computing device or a print device to be printed.

Figure 5:
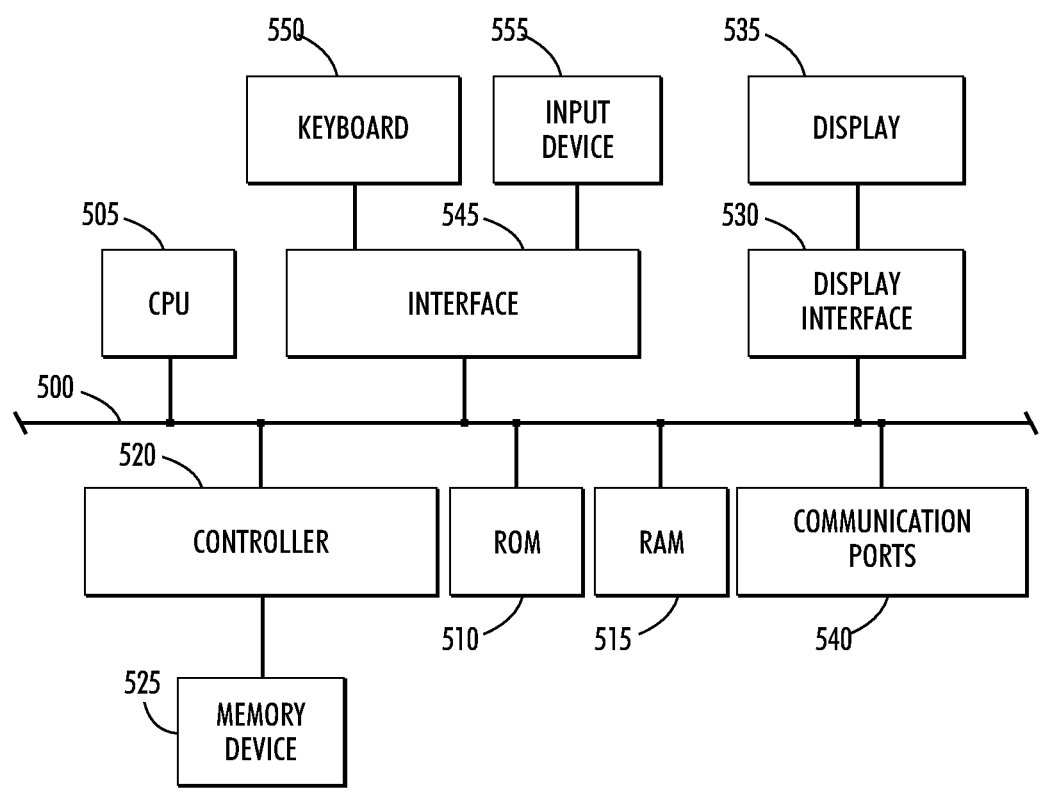
FIG. 5 depicts a block diagram of exemplary internal hardware that may be used to contain or implement program instructions according to an embodiment.

FIG. 5 depicts a block diagram of exemplary internal hardware that may be used to contain or implement program instructions, such as the process steps discussed above in reference to FIGS. 2 and 3, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices or processor-readable storage media.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. Communication with external devices, such as a print device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A print device comprising:
    an inbound queue in communication with a cloud administration system via a firewall, wherein the cloud administration system operates as a shared resource for the print device;
    a transmission module in communication with the cloud administration system; and
    a plurality of outbound queues, wherein each outbound queue corresponds to a print job type or a type of print device information, wherein each queue is in communication with the transmission module,
    wherein the cloud administration system is located remotely from the print device.

2. The print device of claim 1, wherein the plurality of outbound queues comprise a raster image processing queue configured to store one or more print jobs to be raster image processed and configured to transmit the one or more print jobs to the transmission module, wherein the transmission module is configured to transmit the one or more print jobs to the cloud administration system.

3. The print device of claim 1, wherein the plurality of outbound queues comprise a scan queue configured to store one or more print jobs that have been scanned by the print device and configured to transmit the one or more print jobs to the transmission module, wherein the transmission module is configured to transmit the one or more print jobs to the cloud administration system.

4. The print device of claim 1, wherein the plurality of outbound queues comprise a hold queue in communication with the cloud administration system, wherein the hold queue is configured to store one or more print jobs to be backed up by the cloud administration system, wherein the hold queue is configured to transmit the one or more print jobs to the transmission module, wherein the transmission module is configured to transmit the one or more print jobs to the cloud administration system.

5. The print device of claim 1, wherein the plurality of outbound queues comprise an accounting information queue in communication with the cloud administration system, wherein the accounting information queue is configured to store accounting information associated with the print device, wherein the accounting information queue is configured to transmit the accounting information to the transmission module, wherein the transmission module is configured to transmit the accounting information to the cloud administration system.

6. The print device of claim 1, wherein the plurality of outbound queues comprise a configuration information queue in communication with the cloud administration system, wherein the configuration information queue is configured to store configuration information associated with the print device, wherein the configuration information queue is configured to transmit the configuration information to the transmission module, wherein the transmission module is configured to transmit the configuration information to the cloud administration system.

7. The print device of claim 1, wherein the plurality of outbound queues comprise a dynamic print device information queue in communication with the cloud administration system, wherein the dynamic print device information queue is configured to store dynamic print device information associated with the print device, wherein the dynamic print device information queue is configured to transmit the dynamic print device information to the transmission module, wherein the transmission module is configured to transmit the dynamic print device information to the cloud administration system.

8. A print device of claim 1, wherein the plurality of outbound queues comprise:
    a raster image processing queue in communication with the cloud administration system, wherein the raster image processing queue is configured to store one or more print jobs to be raster image processed;
    a scan queue in communication with the cloud administration system, wherein the scan queue is configured to store one or more print jobs that have been scanned by the print device;
    a hold queue in communication with the cloud administration system, wherein the hold queue is configured to store one or more print jobs to be backed up by the cloud administration system;
    an accounting information queue in communication with the cloud administration system, wherein the accounting information queue is configured to store accounting information associated with the print device;
    a configuration information queue in communication with the cloud administration system, wherein the configuration information queue is configured to store configuration information associated with the print device; and
    a dynamic print device information queue in communication with the cloud administration system, wherein the dynamic print device information queue is configured to store dynamic print device information associated with the print device.

9. A method of managing a print job, the method comprising:
    receiving, by a print device, a print job;
    storing the print job in one of a plurality of outbound queues associated with the print device; wherein each outbound queue corresponds to a print job type or a type of print device information; and
    transmitting the print job to a cloud administration system to be stored in a storage module associated with the cloud administration system that corresponds to the outbound queue, wherein the cloud administration system is located remotely from the print device, wherein a firewall exists between the cloud administration system and the print device.

10. The method of claim 9, wherein:
    receiving a print job comprises receiving a print job from a computing device; and storing the print job comprises storing the print job in a raster image processing queue.

11. The method of claim 9, wherein:
receiving a print job comprises receiving a print job that is scanned using the print device; and
storing the print job comprises storing the print job in a scan queue.

12. A method of managing print device information, the method comprising:
receiving, by a transmission module of a print device, print device information associated with the print device over a period of time from one of a plurality of outbound queues associated with the print device, wherein each outbound queue corresponds to a print job type or a type of print device information, wherein each outbound queue is in communication with the transmission module: and
transmitting, by the transmission module, the print device information to a cloud administration system in communication with the print device, wherein the print device is located remotely from the cloud administration system, wherein a firewall exists between the cloud administration system and the print device.

13. The method of claim 12, wherein:
receiving print device information comprises receiving accounting information associated with the print device over the period of time from an accounting information queue associated with the print device; and
transmitting print device information comprises transmitting the accounting information to the cloud administration system.

14. The method of claim 13, wherein transmitting accounting information comprises transmitting one or more of the following:
a number of total impressions processed by the print device over the period of time;
a number of monochrome impressions processed by the print device over the period of time;
a number of color impressions processed by the print device over the period of time;
a color price per impression;
a monochrome price per impression;
a number of print-related functions performed by the print device over the period of time; and
a cost associated with one or more print-related functions.

15. The method of claim 12, wherein:
receiving print device information comprises receiving configuration information associated with the print device over the period of time from a configuration information queue associated with the print device, and
transmitting print device information comprises transmitting the configuration information to the cloud administration system.

16. The method of claim 15, wherein transmitting the configuration information comprises transmitting one or more of the following:
information associated with one or more print trays of the print device;
information associated with a memory of the print device;
information associated with one or more error logs of the print device;
information associated with one or more settings of the print device;
information associated with one or more properties of the print device;
a printer name associated with the print device;
a printer uniform resource identifier associated with the print device;
a location associated with the print device; and
a model associated with the print device.

17. The method of claim 15, further comprising receiving, by the print device, configuration information from the cloud administration system.

18. The method of claim 15, further comprising:
sending, by the print device, a request for the configuration information to the cloud administration system; and
receiving, by the print device, configuration information from the cloud administration system.

19. The method of claim 12, wherein:
receiving print device information comprises receiving dynamic print device information associated with the print device over the period of time from a dynamic print device information queue associated with the print device, and
transmitting print device information comprises transmitting the dynamic print device information to the cloud administration system.

20. The method of claim 19, wherein transmitting the dynamic print device information comprises transmitting one or more of the following:
a registry value,
file version information;
an indication of whether an expression exists within a file;
an indication of whether a string exists within a file;
an indication of whether a file exists;
an indication of whether a file path exists;
a service status; and
a process status.

* * * * *